United States Patent
Sinha

(10) Patent No.: US 9,306,230 B2
(45) Date of Patent: Apr. 5, 2016

(54) ONLINE ESTIMATION OF CATHODE INLET AND OUTLET RH FROM STACK AVERAGE HFR

(75) Inventor: Manish Sinha, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 777 days.

(21) Appl. No.: 12/622,212

(22) Filed: Nov. 19, 2009

(65) Prior Publication Data
US 2011/0113857 A1 May 19, 2011

(51) Int. Cl.
*G01R 27/00* (2006.01)
*H01M 8/04* (2006.01)
*H01M 8/10* (2006.01)

(52) U.S. Cl.
CPC ........ *H01M 8/04358* (2013.01); *H01M 8/0441* (2013.01); *H01M 8/04395* (2013.01); *H01M 8/04835* (2013.01); *H01M 8/04843* (2013.01); *H01M 8/04977* (2013.01); *H01M 2008/1095* (2013.01); *Y02E 60/50* (2013.01)

(58) Field of Classification Search
CPC ....................................................... G01R 27/00
USPC ................................................ 73/29.02, 1.07
See application file for complete search history.

(56) References Cited

U.S. PATENT DOCUMENTS

| | | | |
|---|---|---|---|
| 6,376,111 B1 * | 4/2002 | Mathias et al. | 429/413 |
| 2006/0263654 A1 * | 11/2006 | Goebel et al. | 429/13 |
| 2007/0281193 A1 * | 12/2007 | Arthur et al. | 429/23 |
| 2007/0287041 A1 * | 12/2007 | Alp et al. | 429/22 |

FOREIGN PATENT DOCUMENTS

EP   350013 A1 *   1/1990

* cited by examiner

*Primary Examiner* — Laura Martin
*Assistant Examiner* — Alex Devito
(74) *Attorney, Agent, or Firm* — John A. Miller; Miller IP Group, PLC

(57) ABSTRACT

A method for estimating cathode inlet and cathode outlet relative humidity (RH) of a fuel cell stack. The method uses a model to estimate the high frequency resistance (HFR) of the fuel cell stack based on water specie balance, and also measures stack HFR. The HFR values from the estimated HFR and the measured HFR are compared, and an error between the HFR values is determined. An online regression algorithm is then utilized to minimize the error and the solution of the regression is the RH profile in the stack including the cathode inlet and outlet relative humidities.

16 Claims, 3 Drawing Sheets

ONLINE ESTIMATION OF CATHODE INLET AND OUTLET RH FROM STACK AVERAGE HFR

BACKGROUND OF THE INVENTION

1. Field of the Invention

This invention relates generally to a method for estimating fuel cell stack cathode inlet and cathode outlet relative humidity (RH) from stack high frequency resistance (HFR) and, more particularly, to a method for measuring the HFR of a stack, estimating a model HFR of the stack, minimizing an error between the fuel cell measured HFR and the model HFR, and using a water specie balance to estimate cathode inlet and cathode outlet RH.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack. For stack durability purposes, it is desirable to minimize the number of relative humidity cycles of the membrane because cycling between RH extremes has been shown to severely limit membrane life. Membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life.

As mentioned above, water may be generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. Water in the cathode exhaust gas at one side of the membrane is absorbed by the membrane and transferred to the cathode air stream at the other side of the membrane.

During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, droplets form in the flow channels. As the size of the droplets increases, the flow channel is closed off, and the reactant gas is diverted to other flow channels because the channels are in parallel between common inlet and outlet manifolds. As the droplet size increases, surface tension of the droplet may become stronger than the delta pressure trying to push the droplets to the exhaust manifold so the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

High frequency resistance (HFR) is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined. This HFR measurement allows for an independent measurement of the fuel cell membrane humidification, thereby eliminating the need for RH sensors.

The average HFR of a fuel cell stack, terminal to terminal, provides a good measure of average stack membrane humidification, $RH_{avg}$. While controlling fuel cell stack membrane humidification using $RH_{avg}$ may be sufficient to meet efficiency targets, it is the presence of liquid water in the cathode inlet flow channels and the cathode outlet flow channels that directly correlates to poor reliability, durability and damage caused by freezing in a fuel cell system.

It is known in the art to provide an inlet RH sensor in the cathode air inlet of a fuel cell system to measure the humidification of the cathode inlet gas stream. Using the measured inlet relative humidity and the water specie balance, or mass balance of water, the RH profile of the fuel cell system, including cathode air outlet flow, can be estimated. However, this approach requires the use of inlet RH sensors which are prone to failing in the presence of liquid water, thus, flooding or over drying of the fuel cell stack may result. Furthermore, estimating the outlet RH of the cathode air flow based on the water specie balance is an approach that is sensitive to temperature and stoichiometry. Thus, errors in temperature, air flow and current management can result in poor control of the humidification of the fuel cell stack.

Therefore, there is a need in the art for a fuel cell stack water management system that is capable of estimating and controlling cathode inlet flow relative humidity and cathode outlet flow relative humidity from an average HFR measurement for use in online controls.

SUMMARY OF THE INVENTION

In accordance with the teachings of the present invention, a method for estimating cathode inlet and cathode outlet relative humidity (RH) of a fuel cell stack is disclosed. The method uses a model to estimate the high frequency resistance (HFR) of the fuel cell stack based on water specie balance, and also measures stack HFR. The HFR values from the estimated HFR and the measured HFR are compared, and an error between the HFR values is determined. An online regression algorithm is then utilized to minimize the error and the solution of the regression is the RH profile in the stack including the cathode inlet and outlet relative humidities.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for estimating a cathode inlet and cathode outlet relative humidity by measuring the high frequency resistance of a fuel cell stack is merely exemplary in nature, and is in no way intended to limit the invention or its applications or uses.

Figure 1:
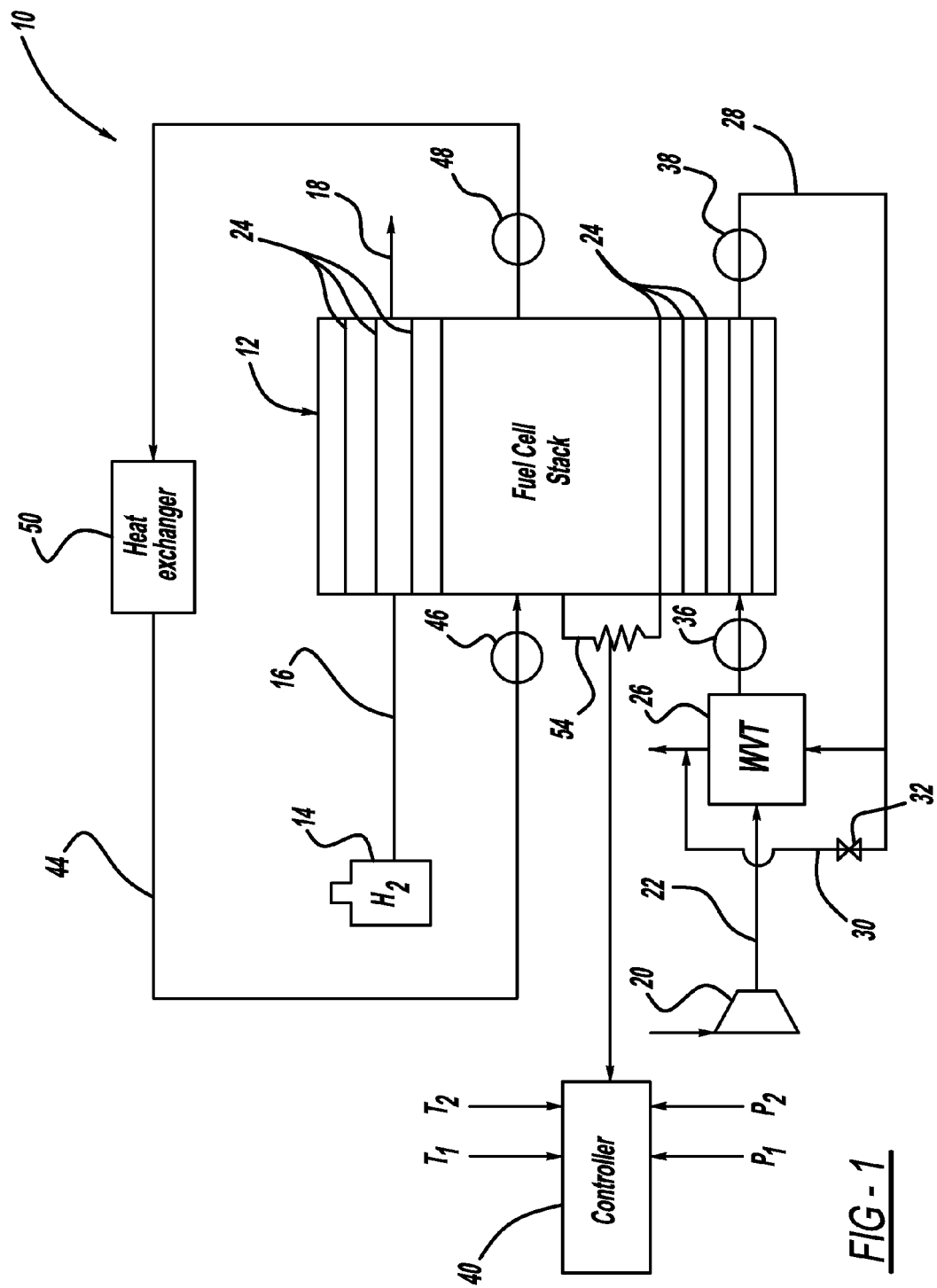
FIG. 1 is a schematic block diagram of a fuel cell system.

FIG. 1 is a schematic block diagram of a fuel cell system 10 including a fuel cell stack 12. The fuel cell stack 12 includes a plurality of fuel cells 24 where each fuel cell 24 includes a membrane electrode assembly (MEA) separated from each other by electrically conductive, liquid-cooled bipolar separator plates (not shown). The fuel cell stack 12 receives hydrogen from a hydrogen source 14 on anode input line 16 and provides an anode exhaust gas on line 18. A compressor 20 provides an air flow to the cathode side of the fuel cell stack 12 on cathode input line 22 through a water vapor transfer (WVT) unit 26 that humidifies the cathode input air. A cathode exhaust gas is output from the stack 12 on a cathode exhaust gas line 28. The exhaust gas line 28 directs the cathode exhaust to the WVT unit 26 to provide the humidity to humidify the cathode input air. A by-pass line 30 is provided around the WVT unit 26 and a by-pass valve 32 is provided in the by-pass line 30 and is controlled to selectively redirect the cathode exhaust gas through or around the WVT unit 26 to provide the desired amount of humidity to the cathode input air.

A cathode input pressure sensor 36 is provided in the cathode input line 22 to measure the pressure therein. Similarly, a cathode exhaust pressure sensor 38 is provided in the cathode exhaust gas line 28 to measure the pressure therein. A controller 40 controls the by-pass valve 32, and also monitors the cathode input pressure sensor 36 and cathode exhaust pressure sensor 38.

A coolant flow path 44 supplies coolant to the fuel cell stack 12. A coolant inlet temperature sensor 46 is provided on the coolant flow path 44 to measure the temperature of the coolant flowing into the stack 12, and a coolant outlet temperature sensor 48 is provided on the coolant flow path 44 to measure the temperature of the coolant flowing out of the stack 12. A heat exchanger 50 is also provided in the coolant flow path 44 to cool the coolant and control the temperature of the fuel cell stack 12.

An HFR sensor 54 measures the high frequency resistance (HFR) of the fuel cell stack 12, thereby allowing the cell membrane humidification of the fuel cell stack 12 to be determined by the controller 40. The HFR sensor 54 operates by measuring the ohmic resistance, or membrane protonic resistance of the fuel cell stack 12. The controller 40 also communicates with the various components of the fuel cell system 10 to control and coordinate their position. For example, the controller 40 communicates with the compressor 20 to control the stoichiometric quantity of cathode air supplied to the fuel cell stack 12. The controller 40 also communicates with the WVT unit 26 to control the humidification of the cathode input air, the heat exchanger 50 to control the temperature of the stack 12, and communicates with the temperature sensors 46 and 48 and the pressure sensors 36 and 38 to monitor the coolant temperature and the cathode air pressure, respectively.

The controller 40 determines the average HFR measurement of the fuel cell stack 12 to estimate both the inlet RH of the cathode input air on the line 22 and the outlet RH of the cathode exhaust gas on the line 28. Determining inlet and outlet RH based on the HFR measurement of the stack 12 eliminates the need for RH sensors which can be costly and unreliable. The strategy for determining the inlet and outlet RH of a fuel cell stack is described in more detail below.

Figure 2:
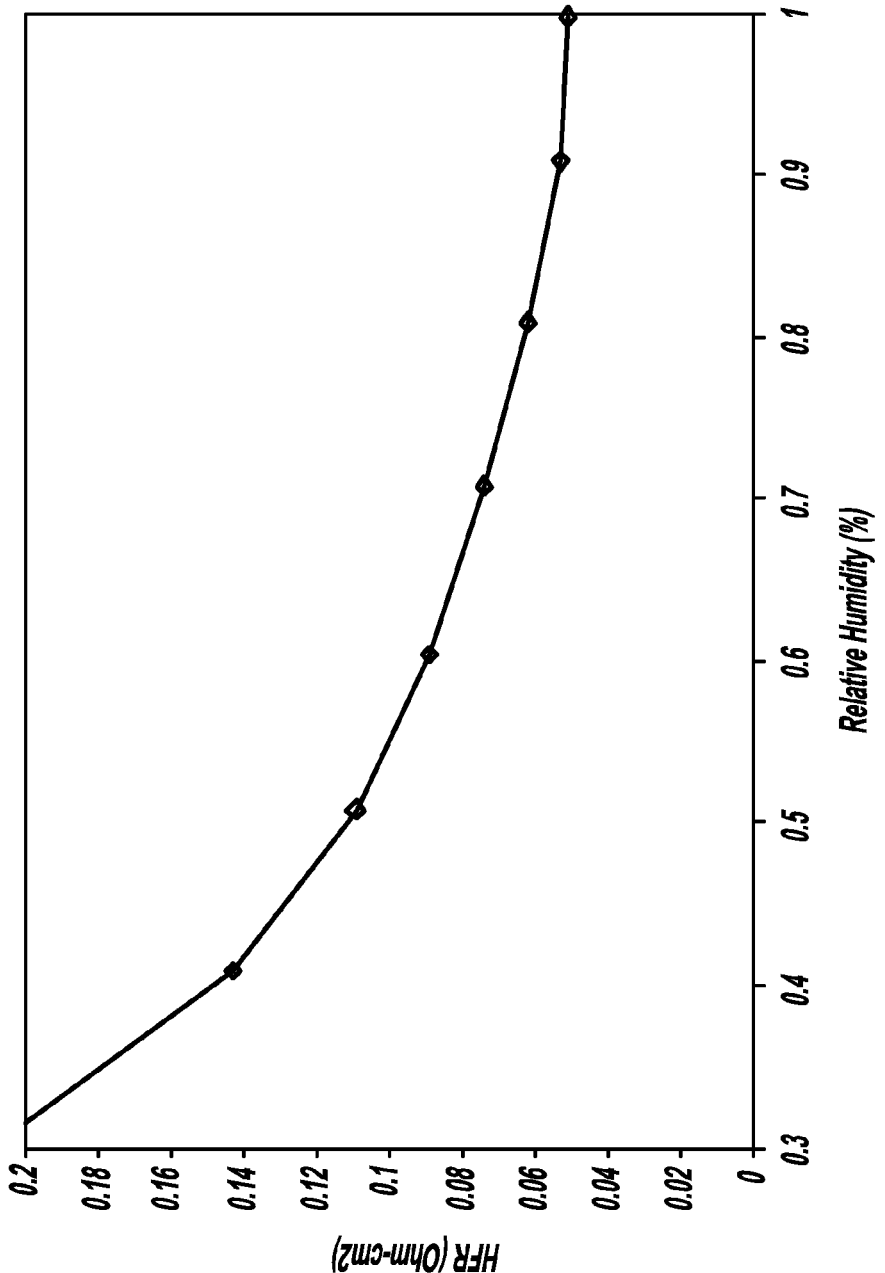
FIG. 2 is a graph with relative humidity on the x-axis and typical high frequency resistance on the y-axis.

FIG. 2 illustrates a typical relationship between average HFR on the y-axis and average RH on the x-axis. For example, if the HFR of a stack is 80 m$\Omega$-cm$^2$ and the stack is running at low power, the average RH is approximately 65%. Thus, an HFR based estimation of the humidification of a fuel cell stack offers an approach that directly measures the internal state of membrane electrode assembly (MEA) hydration, i.e., offers a "stack-as-sensor" approach.

Based on measured HFR and the RH-HFR curve of FIG. 2, the average relative humidity $RH_{avg}$ can be estimated. As is apparent to those skilled in the art, if the HFR changes significantly with stack current density, RH-HFR curves can be generated for different current densities and be used to estimate $RH_{avg}$.

Additionally, it has been found that the RH profile will depend on the change in coolant temperature as measured entering and exiting the fuel cell stack, with a greater change in temperature correlating to a greater spread in the cathode inlet and the cathode outlet RH. In addition, to a smaller extent, pressure changes also affect inlet and outlet RH, with a higher change in pressure causing an increase in the spread between the cathode inlet RH and the cathode outlet RH.

Figure 3:
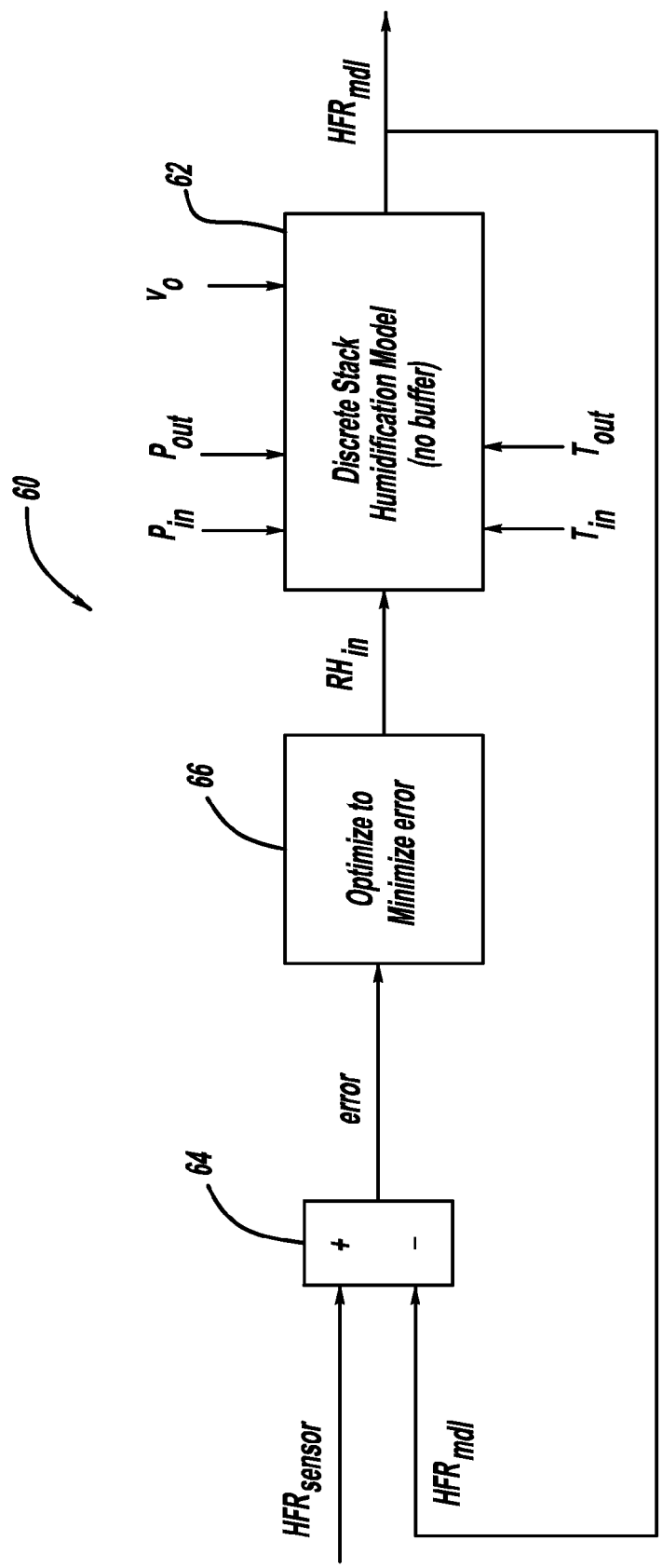
FIG. 3 is a schematic block diagram of the HFR based inlet and outlet RH estimator.

FIG. 3 is a schematic block diagram of an HFR based inlet and outlet RH estimator 60. A discrete stack humidification model at box 62 calculates a model high frequency resistance estimate $HFR^{mdl}$ based on estimated $RH_{in}$, air flow from cathode stoichiometry $v_o$, inlet temperature and outlet temperature of the coolant, $T_{in}$ and $T_{out}$, respectively, and inlet pressure and outlet pressure of cathode air flow, $P_{in}$ and $P_{out}$, respectively. The calculated $HFR^{mdl}$ is compared to an HFR measured by the HFR sensor 54, $HFR_{sensor}$, at box 64 to provide an error as the difference between $HFR^{mdl}$ and $HFR_{sensor}$. A regression algorithm, such as optimization using a proportional integral-derivative (PID) controller, is used to minimize the error at box 66 and provide the RH profile, or average RH of the stack. One skilled in the art will recognize various regression tools are available to minimize the error discussed above. The details of the flow diagram of FIG. 3 are discussed in more detail below.

If $\alpha$ is defined as the coordinate from cathode inlet to cathode outlet (0-1), the HFR can be estimated along this coordinate based on water specie balance to estimate the MEA state of hydration ($\lambda$) using the following equation:

$$HFR^{mdl}(\alpha) = f(y_{in}, P(\alpha), T(\alpha), v_o) \quad (1)$$

Where $HFR^{mdl}$ is the model estimate of average stack HFR, $\alpha$ is the reaction coordinate from the cathode inlet to cathode outlet (0-1), $y_{in}$ is the mole fraction of water at the cathode inlet (as estimated from $RH_{in}$ and cathode inlet T, P), $P(\alpha)$ is the pressure at a where the pressure profile is constructed from stack change in pressure to flow characterization and inlet pressure ($P_{in}$), $T(\alpha)$ is based on measurements from sensors, assuming a linear temperature rise from the coolant inlet temperature to the coolant outlet temperature, and $v_o$ is cathode stoichiometry, which indicates air flow and current. The function $f$ is mass balance where reaction water results in increasing water mole fraction in the cathode stream along with the reaction coordinates and where the RH at any point can be estimated based on molar fraction, temperature and pressure according to equation (4) below. A characteristic curve, such as shown in FIG. 2, can then be used to create an HFR profile along the reaction coordinates.

Using equation (1), the average stack HFR can be estimated by integrating $HFR^{mdl}(\alpha)$ over a according to the following equation:

$$HFR_{avg}^{mdl} = \frac{\int f(y_{in}, P(\alpha), t(\alpha), v_o) d\alpha}{\int d\alpha} \quad (2)$$

Where $HF_{avg}^{mdl}$ is the model estimate of stack HFR. Once $HFR_{avg}^{mdl}$ is known, the objective is to search for the inlet RH of the cathode air flow such that the resulting RH profile ($RH(\alpha)$) and $HFR_{avg}^{mdl}$ matches the measured HFR ($HFR_{avg}^{sensor}$). This is posed as an optimization problem, and can be illustrated according to the following equation:

$$\text{minimize} RH_{in} PMM = |HFR_{avg}^{mdl} - HFR_{avg}^{sensor}| \quad (3)$$

Where equation (3) is subject to: $0 < RH_{in} < 100$. $RH_{in}$ is the RH of the cathode inlet air, and is determined using the following equation:

$$RH_{in} = \frac{y_{in} \cdot P_{in}}{P^{sat}(T_{in})} \quad (4)$$

Where PMM is plant model mismatch and the objective of this optimization is to minimize the mismatch. The solution of PMM is the estimated inlet RH and RH profile. The method for estimated cathode inlet and outlet RH based on HFR is described in more detail below.

As discussed above, stack HFR is measured, as is inlet and outlet cathode air pressure, inlet and outlet coolant temperature, and cathode stoichiometry (based on measured current and measured air flow). Additionally, an initial value of the cathode inlet RH is estimated. This value can be stored from a previous shutdown or could be estimated, for example, as 50% cathode inlet RH as a reasonable guess. Those skilled in the art will appreciate that there are several methods for estimating the initial value of the cathode inlet RH.

Next, a water specie balance is performed to construct $HFR_{avg}^{mdl}$ as discussed above. Water specie balance, or the mass balance of water, is input+generation=output+accumulation. Once the model HFR is compared to the sensor measured HFR, an error is determined and optimization occurs. Optimization search direction and step size may be illustrated using the following equation:

$$RH_{in}^{t} = RH_{in}^{t-1} + k \quad (5)$$

Where k is step size and $RH_{in}^{t}$ is the virtual sensor of RH at time t. Note that as $RH_{in}$ increases HFR decreases, thus the sign of k is negative (search direction). In addition, an estimate of sensitivity of $RH_{in}$ to HFR can be illustrated in the following equation:

$$\frac{1 \text{ m}\Omega - \text{cm}^2}{[\% RH]} \quad (6)$$

In other words, an increase of inlet RH by 10% would result in a decrease of HFR by about 10 m$\Omega$-cm$^2$. Thus:

$$k = \frac{-1 \text{ m}\Omega - \text{cm}^2}{[\% RH]} \quad (7)$$

The discussion above illustrates how the step size can be calculated. Since the RH-HFR curve is non-linear, see FIG. 2, the step size may be different based on the nominal RH operating point.

Next, $y_{in}^{t}$ is computed according to the following equation:

$$RH_{in}^{t} \times \frac{P^{sat}(T_{in})}{P_{in}} \quad (8)$$

Thus, the water specie balance may be solved to estimate outlet RH. In this way, cathode inlet RH and cathode outlet RH can be estimated using HFR, thereby eliminating the need for RH sensors, which may be costly and inaccurate.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a cathode inlet and cathode outlet relative humidity (RH) of a fuel cell stack based on a high frequency resistance (HFR) of the fuel cell stack, said method comprising:
measuring inlet and outlet pressure of a cathode air flow passing through the fuel cell stack;
measuring inlet and outlet coolant temperature of a coolant passing through the fuel cell stack;
determining cathode stoichiometry based on measured stack current and measured cathode air flow;
utilizing a model to estimate the HFR of the fuel cell stack, wherein the model uses the measured inlet and outlet pressure of the cathode air flow, the measured inlet and outlet coolant temperature of the coolant, and the cathode stoichiometry to estimate the HFR;
measuring the HFR of the fuel cell stack using an HFR sensor;
comparing the model estimation of the HFR of the fuel cell stack to the measured HFR from an HFR sensor;
determining an error between the estimated model HFR and the HFR measured by the HFR sensor;
minimizing the error between the estimated model HFR and the HFR measured, wherein minimizing the error includes minimizing a plant model mismatch;
estimating the cathode outlet RH by solving a water specie balance;
estimating an average stack HFR by integrating the model estimation of the HFR from cathode inlet to cathode outlet; and
determining a cathode inlet RH and calculating a step size such that the resulting RH profile matches the measured HFR and the model average HFR after the error has been minimized.

2. The method according to claim 1 wherein minimizing the error between the estimated model HFR and the measured HFR includes optimizing the difference between the estimated model HFR and the measured HFR.

3. The method according to claim 1 further comprising determining the mole fraction of water in the cathode inlet from the cathode inlet RH that matches the measured HFR and the model average HFR after the error has been minimized.

4. The method according to claim 3 further comprising determining cathode outlet RH from the mole fraction of water in the cathode inlet by solving the water specie balance.

5. A method for estimating a cathode inlet and cathode outlet relative humidity (RH) of a fuel cell stack based on a high frequency resistance (HFR) of a fuel cell stack, said method comprising:
utilizing a model to estimate the HFR of the fuel cell stack;
measuring the HFR of the fuel cell stack;
comparing the model estimation of the HFR of the fuel cell stack to the measured HFR;
determining an error between the estimated model HFR and the HFR measured;
utilizing a regression tool to minimize the error, wherein minimizing the error includes minimizing a plant model mismatch;
estimating the cathode outlet RH by solving a water specie balance; and
determining a cathode inlet RH and calculating a step size such that the resulting RH profile matches the measured HFR and the model estimation of HFR after the error has been minimized.

6. The method according to claim 5 wherein utilizing a model to estimate the HFR of the fuel cell stack includes measuring cathode stoichiometry, which indicates air flow and current.

7. The method according to claim 5 wherein utilizing a model to estimate the HFR of the fuel cell stack includes measuring the temperature of a coolant flow entering the fuel cell stack and exiting the fuel cell stack.

8. The method according to claim 5 wherein utilizing a model to estimate the HFR of the fuel cell stack includes measuring the pressure of the cathode air entering the fuel cell stack and the pressure of the cathode air exiting the fuel cell stack.

9. The method according to claim 5 wherein utilizing a model to estimate the HFR of the fuel cell stack includes estimating an initial cathode inlet relative humidity.

10. The method according to claim 5 wherein minimizing the error between the estimated model HFR and the measured HFR includes optimizing the difference between the estimated model HFR and the measured HFR.

11. The method according to claim 5 further comprising estimating an average stack HFR by integrating the model estimation of HFR from cathode inlet to cathode outlet.

12. The method according to claim 5 further comprising determining a mole fraction of water in the cathode inlet from the cathode inlet RH that matches the measured HFR and the model average HFR after the error has been minimized.

13. The method according to claim 12 further comprising determining outlet RH from the mole fraction of water in the cathode inlet by solving the water specie balance.

14. A method for estimating a cathode inlet and cathode outlet relative humidity (RH) of a fuel cell stack based on a high frequency resistance (HFR) of a fuel cell stack, said method comprising:
determining cathode stoichiometry based on measured current and measured air flow;
estimating an initial value of cathode inlet relative humidity;
measuring cathode inlet air flow pressure and cathode outlet air flow pressure passing through the fuel cell stack;
measuring coolant inlet temperature and coolant outlet temperature passing through the fuel cell stack;
determining an average model HFR based on the cathode stoichiometry, the estimated initial value of cathode inlet relative humidity, the measured cathode inlet and outlet air flow pressure, and the measured coolant inlet and outlet temperature;
measuring the HFR of the fuel cell stack using an HFR sensor;
comparing the average model HFR to the sensor measured HFR and determining any error between the two HFR values;
utilizing a regression tool to minimize the error, wherein minimizing the error includes minimizing a plant model mismatch;
determining the cathode inlet RH and calculating a step size such that the resulting RH profile matches the measured HFR and the model average HFR after the error has been minimized;
determining the mole fraction of water in the cathode inlet from the determined cathode inlet RH that matches the measured HFR and the model average HFR after the error has been minimized; and estimating the cathode air flow outlet RH by solving a water specie balance and subtracting inlet RH from total estimated RH.

15. The method according to claim 14 wherein minimizing the error between the estimated model HFR and the HFR measured from the sensor includes optimizing the difference between the estimated model HFR and the measured HFR.

16. The method according to claim 14 wherein determining an average model HFR includes integrating the model estimation of HFR from cathode inlet to cathode outlet.

* * * * *